United States Patent
Piole et al.

(10) Patent No.: US 8,219,033 B2
(45) Date of Patent: Jul. 10, 2012

(54) SYSTEM OF TRANSMIT ANTENNAS ADAPTED TO PROPAGATION CONDITIONS FOR RADIO BROADCASTING

(75) Inventors: Philippe Piole, Cesson-Sevigne (FR); Pierre-Yves Jezequel, Thorigne Fouillard (FR); François Jacquin, Rennes (FR)

(73) Assignee: TDF, Paris (FR)

( * ) Notice: Subject to any disclaimer, the term of this patent is extended or adjusted under 35 U.S.C. 154(b) by 1028 days.

(21) Appl. No.: 12/093,176

(22) PCT Filed: Nov. 6, 2006

(86) PCT No.: PCT/FR2006/051142
§ 371 (c)(1),
(2), (4) Date: May 9, 2008

(87) PCT Pub. No.: WO2007/057591
PCT Pub. Date: May 24, 2007

(65) Prior Publication Data
US 2008/0278387 A1    Nov. 13, 2008

(30) Foreign Application Priority Data
Nov. 17, 2005    (FR) ...................................... 05 53486

(51) Int. Cl.
*H04B 1/00*    (2006.01)
*H04B 15/00*    (2006.01)
*H04B 17/00*    (2006.01)

(52) U.S. Cl. .................... 455/63.1; 455/67.13

(58) Field of Classification Search ................ 455/63.1, 455/63.4, 67.11, 67.13, 69
See application file for complete search history.

(56) References Cited

U.S. PATENT DOCUMENTS

| | | | | |
|---|---|---|---|---|
| 4,001,832 | A | * | 1/1977 | Chesneau et al. ............. 343/747 |
| 6,104,936 | A | * | 8/2000 | Kronestedt ................ 455/562.1 |
| 7,167,681 | B2 | * | 1/2007 | Kuurne et al. ............. 455/67.11 |
| 2007/0191068 | A1 | * | 8/2007 | Ochi et al. ................. 455/562.1 |

OTHER PUBLICATIONS

Evans, Joseph B et al., The Rapidly Deployable Radio Network, IEEE Journal on Selected Areas in Communications, vol. 17, No. 4, Apr. 1999, pp. 689-703.
Mohammed, Abbas et al., Evaluation of the Bluetooth Link and Antennas Performance for Indoor Office Environment by Measurement Trials and FEMLAB Simulations, IEEE Publication No. XP-010855389. , IEEE, 2005.
Altman, Z. et al., OASYS: FTR&D UMTS Automatic Cell Planning Tool, IEEE, 2002, pp. 338-341.

* cited by examiner

*Primary Examiner* — Nguyen Vo
(74) *Attorney, Agent, or Firm* — Lowe Hauptman Ham & Berner, LLP

(57) ABSTRACT

To broadcast synchronized radio waves in at least one frequency band in a predetermined territory, antennas (AS, ATI, AE) emit waves to respective coverage areas in which receivers (RQ, RB) measure characteristics of the emitted waves and transmit to a central server (SC). The server analyzes the characteristics (CO) as a function of prediction models for broadcasting waves in the territory in order to determine adjustment parameters for the antennas. The server transmits the adjustment parameters to the antennas to control them in order to offer a greater diversity of radio broadcasting services and to optimize coverage areas according to different wave propagation modes.

12 Claims, 5 Drawing Sheets

SYSTEM OF TRANSMIT ANTENNAS ADAPTED TO PROPAGATION CONDITIONS FOR RADIO BROADCASTING

REFERENCE TO RELATED APPLICATION

This application is a continuation of the PCT International Application No. PCT/FR2006/051142 filed Nov. 6, 2006, which is based on the French Application No. 0553486 filed Nov. 17, 2005.

BACKGROUND OF THE INVENTION

1. Field of the Invention

The present invention relates to the broadcasting of synchronized radio waves in a frequency band covering a predetermined territory by means of a network of adaptive emission antennas.

2. Description of the Prior Art

At present, tall radiating masts are often installed far from towns to emit signals in the decameter, hectometer or kilometer band with a relatively high emitted power. However, the future of large radiating masts near or in towns is compromised for reasons of electromagnetic compatibility. Coupling between the structural portion of the mast and various metal structures that may be situated near the mast, such as steel frames in buildings, metal street lamps and electrical energy transport line pylons constitute induced current sources that are difficult to control when installing antennas.

Apart from environmental constraints with regard to installing radiating masts, the deployment of new radio broadcasting services in frequency bands below 30 MHz is faced with a relatively small number of available frequencies and with the digitization of these bands via the DRM (Digital Radio Mondiale) standard, which requires reorganization of the radio spectrum.

Consequently, a new emission antenna technology is necessary for the partial or total coverage of a predetermined territory such as a country using a single frequency or a single group of frequencies for each radio broadcasting service in a given frequency band.

OBJECT OF THE INVENTION

An object of the present invention is to broadcast synchronized radio waves at frequencies associated with radio broadcasting services in a predetermined territory by means of a network of adaptive emission antennas in order to offer a greater diversity of radio broadcasting services and to optimize coverage areas of the network of antennas according to different wave propagation modes.

SUMMARY OF THE INVENTION

To achieve this object, a method for emitting synchronized radio waves in at least one frequency band by a plurality of antennas respectively to coverage areas in which receivers measure characteristics of the emitted waves is characterized in that it comprises the following steps of:

transmitting the measured characteristics from the receivers to a central processing device, analyzing the received characteristics in the central processing device as a function of prediction models for broadcasting waves in the coverage areas in order to determine adjustment parameters for the antennas, transmitting the determined adjustment parameters from the central processing device to the antennas, and controlling the antennas as a function of the adjustment parameters.

The radio waves are broadcast by emission antennas connected to a central processing device that transmits to them adjustment parameters such as radiation diagram variable magnitudes in such a manner as to guarantee optimum radio coverage over a predetermined territory combining the coverage areas.

The emission antennas according to the invention are ground wave antennas and/or ionospheric antennas and/or space wave antennas, and are adaptable in real time in order to encourage modes of propagation of waves emitted in different frequency bands and/or to discourage other propagation modes of waves emitted in different frequency bands.

Broadcasting synchronized waves in a frequency band in accordance with the invention provides an advantageous reorganization of the radio spectrum through optimizing the frequency resource available in the different frequency bands.

Broadcasting waves in accordance with the invention authorizes an advantageous deployment of the emission antennas whereby low-power antennas are installed near conurbations, facilitating compliance with electromagnetic compatibility constraints.

According to another feature of the invention, the adjustment parameters are determined in order to minimize the impact of interference from external signals in the coverage areas and to minimize interference by waves emitted by the antennas to areas other than the coverage areas, especially in boundary areas of the coverage areas. In particular, the adjustment parameters can relate to the directivities and emitted powers of the antennas and/or to switching of the propagation mode of the emitted waves.

Emitting radio waves in accordance with the invention conforms to interference levels outside the predetermined territory and makes it possible to use prohibited frequencies reserved for other countries. For example, emission is effected by ground antennas during the day and complemented by ionospheric antennas during the night.

The invention also relates to a system of antennas for emitting synchronized radio waves in at least one frequency band respectively to coverage areas in which receivers measure characteristics of the emitted waves. The system is characterized in that it comprises a central processing device for analyzing the measured characteristics transmitted from the receivers as a function of prediction models for broadcasting waves in order to determine adjustment parameters for the antennas and for transmitting the determined adjustment parameters to the antennas in order to control the antennas as a function of the received adjustment parameters.

Finally, the invention relates to a computer program adapted to be executed in a central processing device of a system of antennas for emitting synchronized radio waves in at least one frequency band respectively to coverage areas in which receivers measure characteristics of the emitted waves. The program is characterized in that it comprises instructions which, when the program is loaded into and executed in said processing device, perform the steps of:

analyzing the measured characteristics transmitted from the receivers as a function of prediction models for broadcasting waves in the coverage areas in order to determine adjustment parameters for the antennas, and transmitting the determined adjustment parameters to the antennas in order to control the antennas as a function of the adjustment parameters.

BRIEF DESCRIPTION OF THE DRAWINGS

Other features and advantages of the present invention will become more clearly apparent on reading the following description of several preferred embodiments of the invention, given by way of nonlimiting example, with reference to the corresponding appended drawings, in which.

DESCRIPTION OF THE PREFERRED EMBODIMENTS

Antennas for emitting radio waves have a particular architecture for emitting radio waves in a preferred propagation mode and have specific adjustment parameters that are modified to adapt them to the propagation conditions of the waves emitted. In the remainder of the description, each emission antenna is considered to be associated with a emitter and a control unit for interpreting adjustment parameters in particular.

The following terminology is employed in the remainder of the description. An emission antenna radiates "short" waves when the antenna radiates at a substantially decametric usable wavelength $\lambda$. An emission antenna radiates "medium" waves when the antenna radiates at a substantially hectometric usable wavelength $\lambda$. An emission antenna radiates "long" waves when the antenna radiates at a substantially kilometric usable wavelength $\lambda$. The wavelength $\lambda$ corresponds to the central frequency of the frequency band in which waves are to be emitted by the antenna.

In most of FIGS. 1 to 9 showing antennas commented on hereinafter, radiation diagram lobes of the antennas are sometimes drawn for different adjustment parameters.

Figure 1:
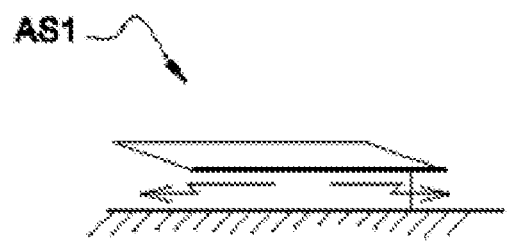
FIG. 1 is a diagrammatic vertical front view of a ground wave emission antenna.

Referring to FIG. 1, a ground wave emission antenna AS1 radiates medium or long waves and essentially comprises a substantially horizontal metal ground plane near and under the surface of the ground, a substantially horizontal open or closed metal excitation loop, and a substantially vertical metal connecting member connecting the excitation loop to the ground plane. The excitation loop extends substantially horizontally above the surface of the ground. The antenna AS1 essentially emits omnidirectional ground waves and few ionospheric waves.

The antenna AS1 is preferably used to radiate medium waves at low power at the periphery of conurbations, because of its discrete appearance in the landscape and its conformance with electromagnetic compatibility issues. For the antenna AS1, the adjustment parameter to be modified is preferably the emitted power.

Figure 2:
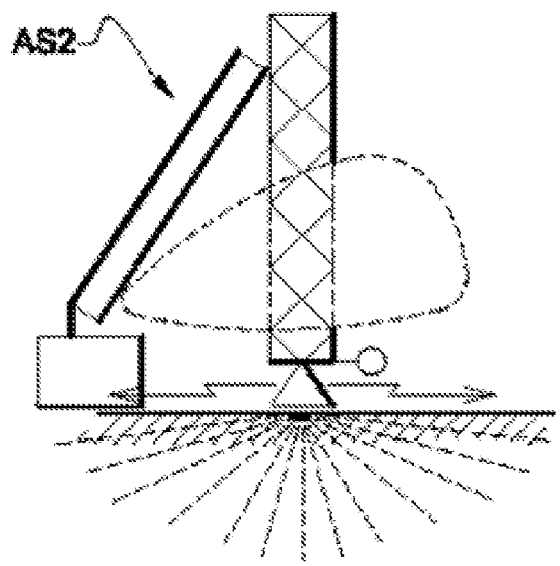
FIG. 2 is a diagrammatic vertical front view of a directional "hot guy" type ground wave emission antenna.

Referring to FIG. 2, a directional "hot guy" ground wave emission antenna AS2 radiates medium or long waves and essentially comprises a vertical mast associated with an active guy connected to a substantially horizontal metal wire ground plane. The emission antenna AS2 essentially emits ground waves with adjustable directivity.

The metal wire ground plane is composed of copper wires, disposed along around 30 to 120 radii around the antenna, with a length close to one quarter-wavelength. The copper wires are buried in the ground at a depth between about 30 cm and about 60 cm from the surface of the ground. The value of a reactance, inductance or capacitance at the foot of the active guy and the position at which the guy is attached to the ground, or in other words the angle formed between the guy and the mast, determine the emit axis of the radiation diagram and the directivity of the ground wave. For example, variation of the value of the reactance changes from omnidirectional broadcasting during the night to broadcasting with a front/back ratio of 25 dB during the day.

Figure 3:
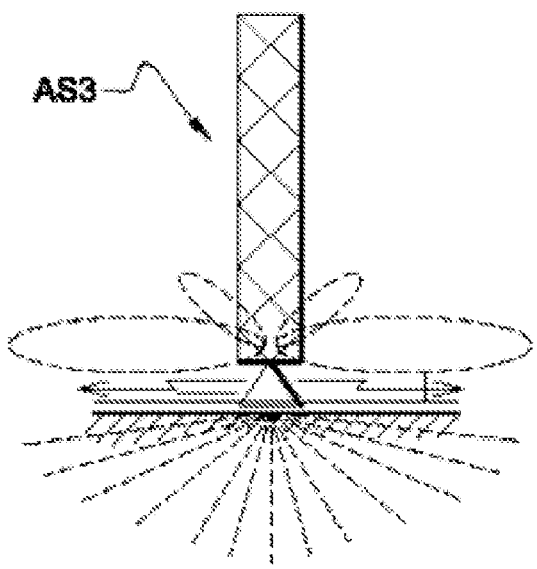
FIG. 3 is a diagrammatic vertical front view of an "anti-fading" type ground wave emission antenna.

Referring to FIG. 3, a ground wave emission antenna AS3 radiates medium or long waves and essentially comprises a vertical mast connected to a substantially horizontal metal wire ground plane. The antenna AS3 radiates only ground waves in a omnidirectional way.

The metal wire ground plane is made up of copper wires disposed along 30 to 120 radii around the antenna, with a length close to one quarter-wavelength. The copper wires are buried in the ground to a depth from 30 to 60 cm from the surface of the ground. This antenna has a pinched radiation diagram at ground level and does not broadcast any waves toward the sensitive layers of the ionosphere. The anti-fading type antenna AS3 is used to radiate high-power ground waves over long distances with no fading phenomena during the night.

FIGS. 4 to 9 show ionospheric emission antennas that radiate short, medium or long waves, i.e. with a substantially decametric, hectometric or kilometric usable wavelength $\lambda$. A firing angle relative to the horizontal determines the range, which varies from 100 km to 2000 km. For example, for a firing angle greater than 60°, the range does not exceed 150 km, and for a firing angle of 40°, the range is approximately 250 km. Ionospheric antennas emit few or no ground wave and the area covered has an annular or elliptical shape the width whereof is inversely proportional to the firing angle.

Figure 4:
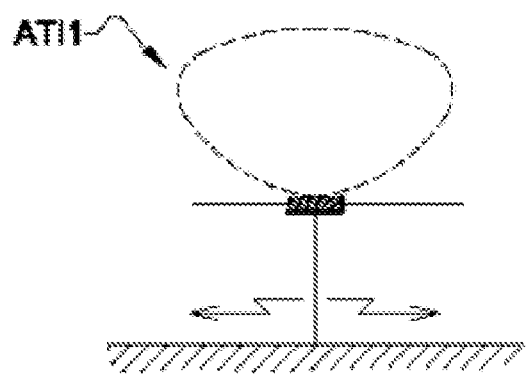
FIG. 4 is a diagrammatic vertical front view of a "horizontal dipole" type ionospheric emission antenna close to the ground.

Referring to FIG. 4, a switchable polarization ionospheric emission antenna ATI1 essentially comprises a substantially horizontal metal ground plane, a substantially horizontal metal dipole with switchable central reactance represented by a black rectangle, and a substantially vertical metal monopole connecting the metal dipole to the ground plane. The antenna ATI1 radiates waves toward the ionosphere with vertical directivity and few ground waves.

The metal dipole extends substantially horizontally above the surface of the ground at an adjustable height approximately equal to one tenth of the wavelength $\lambda$ relative to the ground plane, in order to favor vertical incidence emission with a wide lobe and thus to modify the coverage area provided by the antenna ATI1. The metal monopole assures wide vertical incidence ionospheric emission and radiates ground waves nearby. The coverage area then has a dual location.

Figure 5:
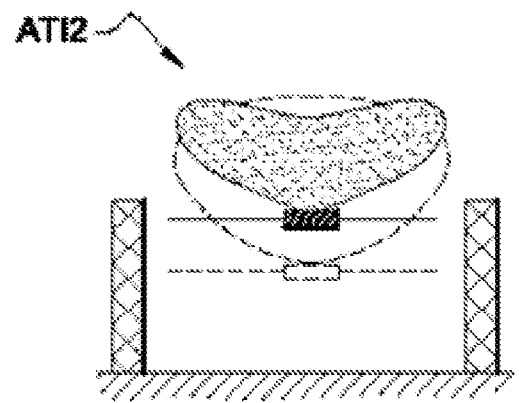
FIG. 5 is a diagrammatic vertical front view of a vertical and variable "horizontal dipole" type ionospheric emission antenna.

Referring to FIG. 5, an ionospheric emission antenna ATI2 essentially comprises a substantially horizontal metal ground plane, a substantially horizontal metal dipole with a switchable central reactance represented by a black rectangle, and two substantially vertical metal masts supporting the metal dipole above the ground plane. The antenna ATI2 radiates waves only toward the ionosphere with adjustable directivity.

As shown by two positions of the metal dipole in FIG. 5, the height separating the metal dipole from the ground plane varies between approximately $\lambda/10$ and approximately $\lambda/3$, which authorizes emission at vertical or oblique incidence, thus modifying the coverage area served by the antenna ATI2.

Figure 6:
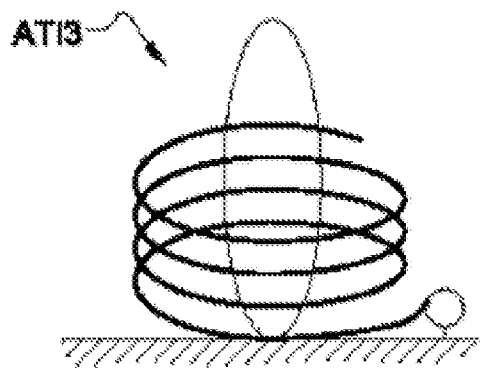
FIG. 6 is a diagrammatic vertical front view of a vertical "helix" type ionospheric emission antenna.

Referring to FIG. 6, an ionospheric emission antenna ATI3 essentially comprises a metal helix extending substantially vertically and positioned above a substantially horizontal metal ground plane. The antenna ATI3 radiates circularly polarized waves toward the ionosphere with a substantially vertical directivity.

The radiation diagram of the antenna depends on the height of the helix. For example, if the height of the helix is small, the radiation diagram shows directivity with a wide lobe like the ionospheric antenna ATI1 with the metal dipole according to FIG. 4. The greater the height of the helix, the narrower the lobe characterizing the directivity of the antenna. The antenna ATI3 serves a narrow local coverage area of annular shape.

Figure 7:
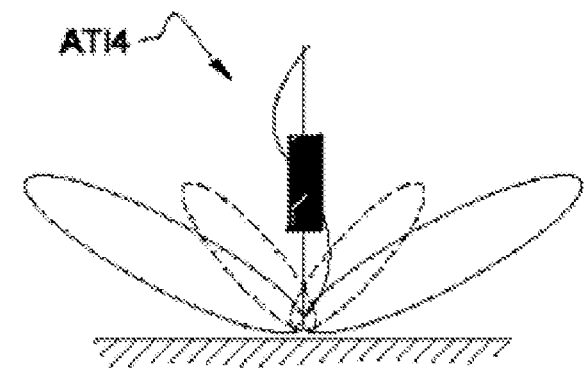
FIG. 7 is a diagrammatic vertical front view of an omnidirectional "mast" type variable ionospheric emission antenna on the ground or raised above the ground.

Referring to FIG. 7, an ionospheric emission antenna ATI4 essentially comprises a vertical mast positioned above a substantially horizontal metal ground plane. The antenna ATI4 radiates waves toward the ionosphere with adjustable directivity and few ground waves.

The vertical mast contains a reactance, represented by a black rectangle, the variable value whereof orients the radiation diagram of the antenna in accordance with omnidirectional emission, directed with a confined oblique incidence. Emitting waves with a vertical incidence is not possible. Moreover, the radiation diagram of the antenna ATI4 can feature separate lobes with different incidences, in order to serve different coverage areas of annular shape.

Figure 8:
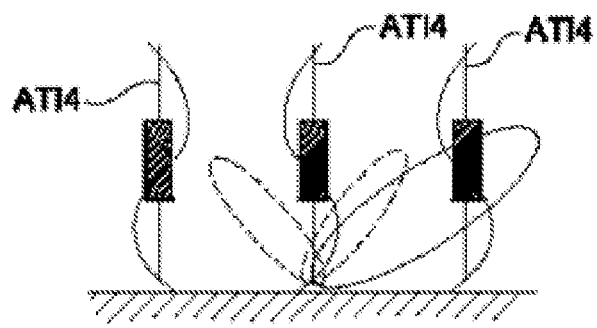
FIG. 8 is a diagrammatic vertical front view of a set of "mast" type switchable directed ionospheric emission antennas on the ground or raised above the ground.

Referring to FIG. 8, ionospheric emission antennas ATI4 are disposed sufficiently close to each other to modify a phase and/or power distribution in order to favor emission of directed waves at oblique incidence.

Unlike a single antenna ATI4, which radiates omnidirectionally, the set of antennas ATI4 has a directionally adaptive radiation diagram, in order to serve a particular coverage area with a high gain, especially in a border area inside a predetermined territory.

Figure 9:
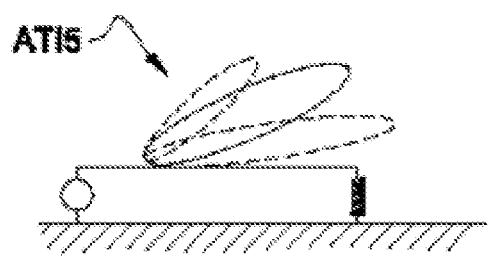
FIG. 9 is a diagrammatic vertical front view of a "long horizontal wire" type directed ionospheric emission antenna close to the ground, also known as a "Beveridge" antenna.

Referring to FIG. 9, a beverage ionospheric antenna ATIS radiates short, medium or long waves with a substantially metric, hectometric or kilometric usable wavelength $\lambda$ and essentially comprises a substantially horizontal metal ground plane buried in the ground, a long metal wire extending substantially horizontally and close to the ground, a generator connecting one end of the wire to the ground plane, and a load connecting the other end of the wire to the ground plane. The antenna ATI5 radiates progressive waves toward the ionosphere with adjustable directivity and few ground short waves.

The antenna ATI5 has a radiation diagram with a narrow lobe at oblique incidence. The metal wire extends substantially horizontally above the surface of the ground at a height of approximately 3 or 4 meters for emitting short waves, generally with a length between $3\times\lambda$ and $8\times\lambda$. Variation of the length of the wire modifies the emission range of the antenna.

The antenna ATI5 serves distant coverage areas corresponding to precise and localized locations such as islands or towns.

In the remainder of the description, ground antennas and ionospheric antennas are designated AS and ATI, respectively.

Space wave emission antennas AE are used to broadcast short waves to conurbations, for example. The waves propagate in a "point to point" mode, in direct line of sight with the area to be served. A space wave antenna is generally disposed at a high point and directed toward the area to be served.

The directivity of space wave antennas is modulated mechanically, for example, using a rotor, or electrically, by phase shifting. The directivity is inclined in order to reduce the emitting of unwanted waves into the ionosphere by these antennas.

A space wave antenna consists, for example, a plurality of aerials such as a log-periodic antenna, a Yagi antenna or a panel antenna, disposed to emit in different directions. The space wave antenna can also emit omnidirectionally in an area of discoid shape having the antenna at the center.

Figure 10:
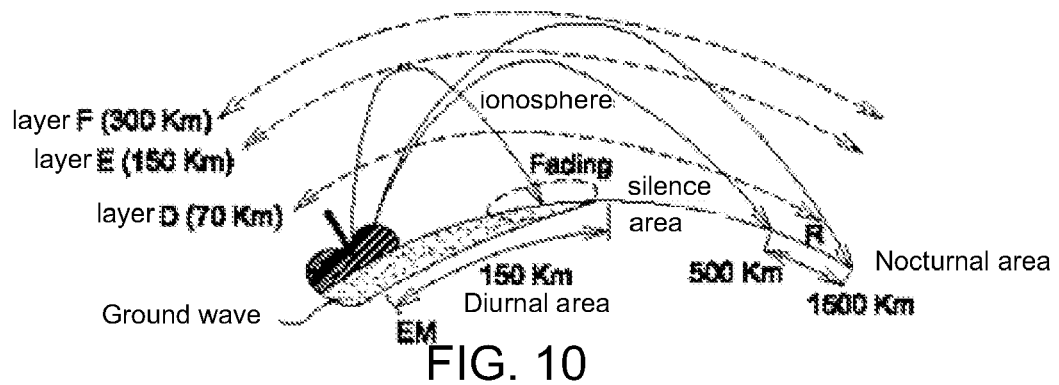
FIG. 10 is a diagram of propagation of medium waves in ionospheric layers.

FIG. 10 is a diagrammatic view of the propagation of medium waves in layers of the ionosphere. During the day, solar radiation, especially ultraviolet radiation, ionizes gas particles that release electrons into the ionosphere. The free electron density increases with altitude in the ionosphere, which is divided into three main layers D, E and F. Altitudes given hereinafter by way of example vary considerably as a function of the day and the night, the season and the activity of the sun, especially the generation of variable sunspots.

The layer D is the lowest and reaches altitudes between approximately 50 and 70 km. The layer D is manifested during the day, but contains air the density whereof is sufficiently high for the ions and the free electrons to recombine and absorb medium waves. At nightfall, the layer D has a concentration of free electrons that falls rapidly and disappears, allowing medium waves to pass through toward the layers E and F.

The layer E reaches altitudes between approximately 70 and 150 km. During the night, the concentration of free electrons falls rapidly as in the layer D, but the layer E does not disappear totally.

The layer F reaches altitudes between 150 and 300 km, approximately. Because the density of air at these altitudes is very low, the ions and the free electrons recombine only partially and the layer F remains ionized during the night.

Radio waves emitted toward the ionosphere suffer attenuation in the layer D that varies as a function of the reciprocal of the square of the frequency of the radio waves. Consequently, low-frequency radio waves reach the layers E and F only during the night, when the layer D disappears. Radio waves suffer increasingly strong refraction as a function of altitude in the layers E and F of the ionosphere in which the free electron density increases with altitude. For high frequencies, refraction becomes sufficient to bend the trajectory along which the radio waves propagate toward the ground; consequently, the layers E and F backscatter radio waves.

Radio waves are reflected in the ionosphere as a function of the angle of incidence and the frequency band in which the radio waves are emitted. During the night, for example, radio waves that are emitted in a high frequency band with a low angle of incidence relative to the horizontal are reflected at high altitude in the layer F to reach a coverage area, called the nocturnal area, far from the emission point EM of the radio wave. In this example, the distance separating the reception point R from the emission point EM of the radio wave varies between approximately 500 km and 1500 km.

Ground waves emitted by a ground antenna have a trajectory that follows the curvature of the Earth, because induced currents on the surface of the ground cause inclination of the wavefront of the radio waves. For example, the ground wave generated by a ground antenna is guided by a strip of ground as a result of multiple reflections at the surface of separation between the dielectric consisting of the ground and the external medium consisting of the air and on a buried metal surface consisting of the ground plane of the antenna. An antenna radiating ground waves serves a coverage area, called the diurnal area, approximately 150 km wide, for example.

During the night, the layer D disappears and radio waves emitted toward the ionosphere reach a coverage area at least 500 km from the emission point EM of the radio waves, for example. However, ground antennas have a limited range, equal to 150 km, for example. There is therefore a zone of silence that does not receive any wave emitted from the emission point EM, whether from a ground antenna or an ionospheric antenna. During the night, the area of silence covers between 150 km and 500 km, for example.

During the day, radio waves emitted by ionospheric antennas can reach a coverage area served by a ground antenna emitting the same radio waves. This results in a fading area in which waves at the same frequency are received with a phase difference causing destructive interference that degrades the quality of reception of the radio waves.

Figure 11:
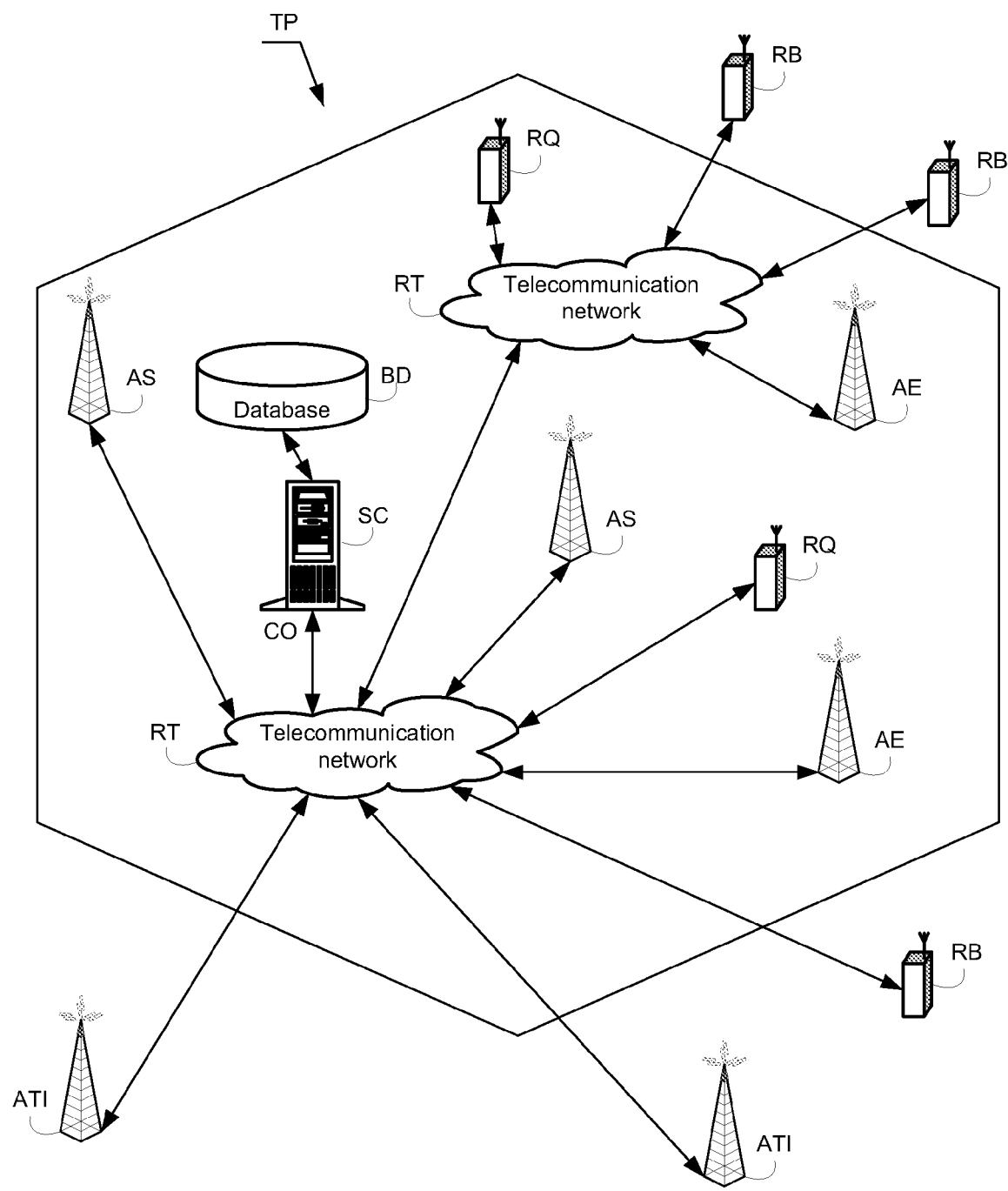
FIG. 11 is a block diagram of a broadcasting system comprising a network of adaptive emission antennas according to the invention.

Referring to FIG. 11, the broadcasting system according to the invention comprises a central server SC, a database BD in communication with the central server SC, at least one ground antenna AS, at least one ionospheric antenna ATI, at least one space wave antenna AE, quality receivers RQ and interference receivers RB.

The central server SC communicates with the antennas and the receivers via an Internet type telecommunication network RT or via dedicated telecommunication lines. The central server constitutes a central processing device of the antenna system for analyzing data, such as measured wave characteristics CO, and determining antenna adjustment parameters, as described hereinafter.

The database BD is linked to the central server SC, i.e. it is either integrated into the central server SC or incorporated into a database management server and connected to the central server by a local or remote link. The database BD includes among other things adjustment parameters relating to propagation modes for each emission site, i.e. relating to each emission antenna, and coefficients specific to each site according to different dates. The adjustment parameters and the coefficients are defined as a function of the propagation modes in such a manner as substantially to preserve predetermined local or global coverage areas.

The antennas serve respective coverage areas the combination of which serves a global coverage area corresponding to a predetermined territory TP, for example, through minimizing zones of silence in which few radio waves are received.

Quality receivers RQ are disposed over the predetermined territory TP, such as a country or a region, to evaluate the quality of reception of radio waves emitted by the various emission antennas AS, ATI, AE.

Moreover interference receivers RB are disposed outside and near the border of the predetermined territory TP to verify if radio broadcast services specific to other territories, such as countries, adjoining the territory TP suffer interference from the radio waves emitted by the various antennas AS, ATI, AE.

The receivers RB are used only when starting up a radio broadcast service or if interference is detected, for example.

The receivers RQ, RB measure wave characteristics CO relating to the reception of waves emitted by the antennas AS, ATI, AE and representing the quality of the waves received, such as powers, impulse responses and signal-to-noise ratios. The received wave characteristics CO are sent to the central server SC via the telecommunication network RT.

Each receiver RQ, RB comprises, apart from a receive antenna and receive stages, hardware and software means for measuring the characteristics CO and sending them to the server SC. For example, the software and hardware means are in the form of an IP (Internet Protocol) server sending data, including the measured characteristics CO in the form of IP packets according to the TCP (Transport Control Protocol) transport protocol.

To broadcast programs over all of the predetermined territory TP, broadcasters emit short and/or medium and/or long waves in respective frequency bands. Moreover, the waves are emitted according to different propagation modes relative to the various antennas AS, ATI, AE.

In a "central" mode, a single omnidirectional central antenna AS generates medium ground waves in order to cover a circular area partially or totally encompassing the predetermined territory TP during the day. During the night, the medium ground waves generated by the central antenna AS have their power reduced and cover a smaller circular area; directional antennas AS situated at the periphery of the predetermined territory TP are then activated in a synchronized manner in order to cover areas not served by the central antenna. For example, the central antenna AS is of "anti-fading" type and the peripheral antennas AS comprise a metal ground plane, like that represented in FIG. 1. To give another example, the central antenna can be an ionospheric antenna ATI generating short waves.

In a "peripheral" mode, directional antennas AS and/or ATI situated at the periphery of the predetermined territory TP generate medium or long ground waves in a synchronized manner in order to cover the predetermined territory TP. The antennas AS are of the same type as the "hot guy" antenna AS2, for example.

In an "external" mode, directional antennas AS situated at the periphery of the predetermined territory TP and generating medium or long waves are activated in a synchronized manner in order to cover the predetermined territory TP. The antennas AS are of the same type as the "hot guy" antenna AS2, for example, and are disposed on islands or offshore platforms in order to benefit from good propagation conditions over water.

In a "confined" mode, directional or omnidirectional antennas AE generate short space waves and are distributed regularly over the predetermined territory TP to serve respective local coverage areas that are separate from each other. These antennas are activated in a synchronized manner to cover the predetermined territory TP. For example, the antennas AE are of "cosecant" type with no emission of waves above the horizon in order to limit interference phenomena caused by waves emission above the horizon and reflected by the ionosphere.

Generally speaking, in areas of the predetermined territory TP, reception of waves emitted in a given frequency band relating to a radio program can suffer interference through the reception of other waves emitted in the same frequency band but relating to at least one other radio program. These interference phenomena occur essentially during the night because of the propagation of interference waves in the ionosphere, said interference waves being broadcast very far from their emission sites and received in areas where other waves are also received and interfere with said interference waves.

Consequently, the electromagnetic field relating to waves is locally reinforced in certain areas by the propagation of ionospheric waves, ground waves or space waves emitted by other antennas of the network of the invention in order to minimize the contribution to the interference of ionospheric waves emitted from other countries, for example.

Moreover, a large number of emission antennas constituting the network ensures propagation diversity and a moderate reception level in order to limit interference linked to high variations in the behavior of the ionosphere and in particular interference phenomena caused by the propagation of ionospheric waves.

Figure 12:
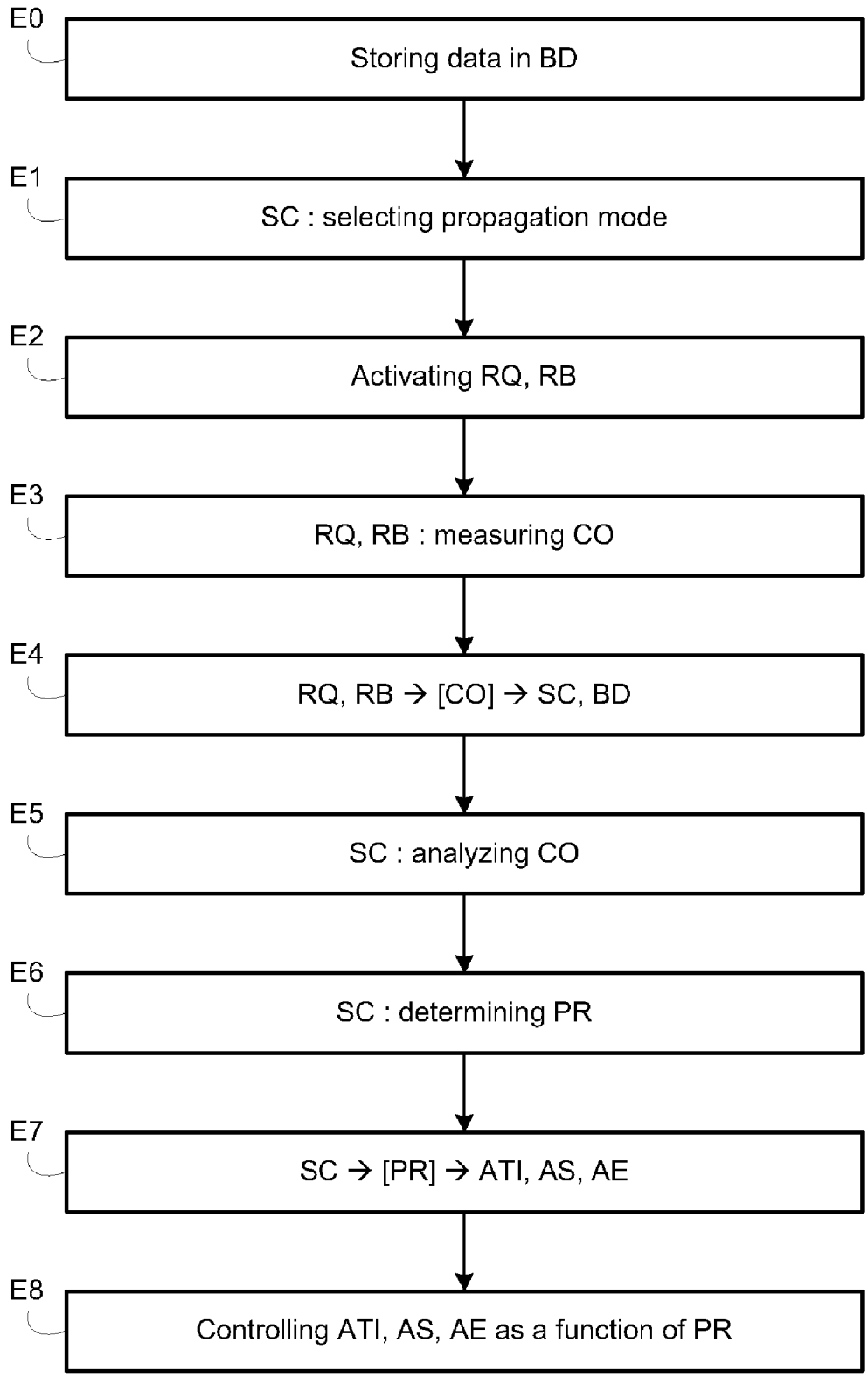
FIG. 12 is an algorithm of an emission method according to the invention.

Referring now to FIG. 12, a preferred embodiment of the emission method of the invention comprises steps E1 to E8 executed automatically in the broadcast system.

In initial steps E0, data necessary for implementation of the invention is stored in the database BD relating to the central server SC. Moreover, antennas ATI and/or AS and/or AE emit waves with respective propagation modes.

Adjustment parameters relating to propagation modes for each emission antenna are stored in the database BD. The adjustment parameters concern among other things directivity, emitted power, polarization and antenna gain and are estimated regularly for serving predetermined coverage areas.

The database BD also contains data such as geographic, geological and topographical information relating to the predetermined territory TP and information on the layout of conurbations. Other data concerns meteorological forecasts and predictions of the behavior of the ionosphere, which depend in particular on solar activity according to the season, the day and the time of day, and the geographical location, for example.

As a function of the above information, time and date data defines coefficients specific to each emission site according to different dates and enable local or global coverage areas to be established as a function of the propagation modes.

The adjustment parameters and the time and date data are associated with antenna switching scenarios intended to conform to levels of interference outside the predetermined territory TP and to guarantee a quality of reception of radio broadcasting services broadcast in the predetermined territory TP. These scenarios are modified progressively in accordance with measured characteristics of received waves in order to establish prediction models for broadcasting waves in the predetermined territory as a function of propagation mode.

In the step E1, the central server SC selects a frequency band comprising all the frequencies associated with respective radio broadcast services emitted on waves having substantially equal usable wavelength. For example, three frequency bands are provided, comprising the short wave band, the medium wave band, and the long wave band, respectively corresponding to frequencies associated with short waves, medium waves and long waves.

The central server SC then selects a propagation mode compatible with the selected frequency band in order to effect tests on the quality of a signal received in and outside the predetermined territory TP, the received signal relating to the selected propagation mode.

Alternatively, a single frequency associated with a radio broadcasting service is selected in order to effect tests on the quality of a signal transported by waves emitted at that frequency.

In another embodiment, different propagation modes and modulation (coding) modes are selected in order to effect the quality tests simultaneously.

In the step E2, the central server SC selects quality receivers RQ disposed in the predetermined territory TP and interference receivers RB disposed outside the predetermined territory TP, according to the selected propagation mode. The selected receivers are activated, for example automatically by the server SC via the network RT, and are adapted to pick up waves emitted by antennas specific to the selected propagation mode.

In the step E3, the receivers measure characteristics CO of the waves emitted. For example, the characteristics are received power, impulse response and signal to noise ratio.

In the coverage areas of the predetermined territory TP, quality receivers RQ compare received powers relating to waves emitted by the antennas AS, ATI, AE of the broadcasting system to predetermine power thresholds in the coverage areas in order to check if a received power relating to a radio broadcasting service specific to the predetermined territory is sufficient as a function of the reception quality criteria. For example, during the night in particular, the quality of reception of a radio broadcasting service is degraded by interference caused by the propagation of ionospheric waves emitted from other countries and the received power relating to the radio broadcasting service must be sufficiently high to counter the interference. The quality receivers RQ also effect goniometer measurements and evaluate bit error rates for received digital signals.

Outside and in the border region of the predetermined territory TP, interference receivers RB compare received powers relating to waves emitted by the antennas AS, ATI, AE of the broadcasting system to receive powers relating to other waves emitted from different territories adjoining the coverage areas, to check if radio broadcasting services specific to the adjoining territories suffer interference from the radio waves emitted by one or more of the antennas AS, ATI, AE. Furthermore, the interference receivers RB can identify the antennas causing external interference and can also effect goniometer measurements.

In step E4, the receivers RQ and RB transmit the measured characteristics CO to the central server SC. For example, the characteristics are transmitted in the form of IP packets via the network RT or by electronic mail or by facsimile, and are interpreted by technicians attached to the central server SC, for example. The characteristics can be transmitted at predetermined times, in particular corresponding to sunrise and sunset, for example.

The central server SC then stores the received characteristics CO in the database BD in order to enrich a detailed history of the characteristics of the waves received by the antennas AS, ATI, AE. The history is necessary for establishing prediction models for broadcasting waves.

Alternatively, all receivers RQ, RB are activated simultaneously in order to effect measurements without discontinuity and constantly to enrich the database BD. In this case, all characteristics received are sorted according to receiver and propagation mode.

In the step E5, the central server SC analyzes the characteristics CO of the received waves as a function of the information included in the database BD, in particular as a function of the wave broadcasting prediction model. The central server analyzes, among other things, the received powers and the results of comparing the received powers with a predetermined power threshold.

Alternatively, the central server SC effects the various comparisons relating to the powers of the waves emitted by the antennas of the broadcasting system after reception of the characteristics CO transmitted by the receivers. In particular, the central server compares received powers relating to waves emitted by the antennas of the broadcasting system to predetermined power thresholds in the coverage areas and to received powers relating to other waves emitted from different adjoining territories just outside the border of the predetermined territory.

The central server SC identifies antennas to be adjusted associated with propagation modes if quality criteria are not respected. For example, if the overall reception of a signal in the predetermined territory TP is too weak during the day and suffers from interference during the night, the "hot guy" type central antenna AS using the "central" propagation mode is identified. The central server compares the received characteristics CO with characteristics estimated using the wave broadcasting prediction models in order to evaluate antenna adjustment parameters respecting quality criteria and where appropriate to modify the antenna switching scenarios.

In the step E6, the central server SC determines antenna adjustment parameters PR to be transmitted to the antennas as a function of the analyses of the received characteristics CO. The adjustment parameters PR are specific to each antenna according to the associated propagation mode. At least one of the following adjustment parameters is to be transmitted to each of the antennas identified: the power, the frequency and the polarization of the waves emitted, the position, the orientation and the height of the antenna, and the inclination and the switching of the directivity of the antenna. Furthermore, the analyses of the received characteristics CO can lead to switching of the propagation mode and thus to a change of the adjustment parameters in such a manner as to deactivate certain antennas and to adjust other antennas again.

The antenna adjustment parameters PR are determined in particular to adapt the selected propagation mode to the distribution of the different coverage areas in order to optimize the quality of reception of a signal and the overall coverage of the predetermined territory TP. Furthermore, the adjustment parameters PR must satisfy the required reception conditions in the coverage areas and in any external areas suffering from interference, i.e. to minimize interference both within the predetermined territory TP and in adjoining countries or any zone other than the coverage areas of the predetermined territory TP.

In the example with the central antenna AS and the "central" mode, the central server modifies the directivity and increases the emitted power for the central antenna AS in order to ensure reception quality in the predetermined territory TP. On the other hand, if the central antenna AS causes interference with services specific to other territories external to the predetermined territory, the central server reduces the emitted power for the central antenna AS and activates directional ground antennas AS at the periphery of the predetermined territory TP and directed toward it, or activates short-range space wave omnidirectional antennas AE situated at the periphery of the predetermined territory TP.

If reception of ground waves emitted by ground antennas AS suffers from interference in a conurbation during the night, other directional or omnidirectional ground antennas AS can be activated locally to counter the interference.

To give another example, short space waves are broadcast inside a conurbation and medium ground waves or space waves are broadcast outside the conurbation. Outside the conurbation, the power of the space short waves becomes too weak to satisfy the reception quality and the medium waves are unsuitable for the location of the conurbation. In this example, the central server SC determines a peripheral area of the conurbation from which the ground or space medium waves must be emitted. Thus digital receivers can switch rapidly and automatically from the short wave band to the medium wave band, or vice-versa, to pick up the same radio broadcasting service on the best available frequency.

The central server SC analyzes the history of the adjustment parameters transmitted previously. If the medium and/or long waves received in a portion of the predetermined territory TP continue to suffer interference despite increasing the emitted power of the medium and/or long waves, space wave antennas AE can be activated to emit short waves the reception whereof does not suffer from interference in said portion of the predetermined territory.

In the step E7, the central server SC transmits the adjustment parameters PR that have been determined to the antennas previously identified. For example, adjustment parameters PR determined for an emission antenna are included in IP packets transmitted via the network RT and are interpreted automatically by a control unit connected to the emission antenna and serving as client for the server SC for remote control of the antenna.

Alternatively, the adjustment parameters PR are transmitted by electronic mail or facsimile and are interpreted by technicians controlling the emission sites attached to the antennas.

In the step E8, emission characteristics of the antennas are controlled mechanically and/or electronically by their control units as a function of the adjustment parameters PR transmitted.

By way of examples of emission characteristics, the emitted power and/or the modulation (coding) relating to one of the emission antennas AS, ATI, AE are adjusted automatically by the control unit connected to the antenna and the radiation diagram of another emission antenna is adjusted manually by a technician in accordance with the adjustment parameters sent, such as a phase shift and a variation of the orientation of the antenna.

The steps E1 to E8 are executed regularly to update the database BD of the central server SC and improve the wave broadcasting prediction models. Moreover, regular updating of the database combines different propagation modes used in the emission antenna system in order at all times to offer an optimum reception quality over the predetermined territory and an absence of interference outside the predetermined territory.

The invention described here concerns a method and a server SC for emitting synchronized radio waves in at least one frequency band to respective coverage areas. In a preferred implementation, the steps of the method of the invention are determined by instructions of a computer program incorporated into a data processing device such as the central server SC. The program includes program instructions which, when said program is loaded into and executed in the device, the operation whereof is then controlled by the execution of the program, carry out the steps of the method according to the invention.

Consequently, the invention applies equally to a computer program, in particular a computer program on or in an information medium, adapted to implement the invention.

The invention claimed is:

1. A method of emitting synchronized radio waves in at least one frequency band by a plurality of emission antennas respectively to coverage areas combined into a predetermined territory including:

measuring characteristics of the waves emitted from said plurality of emission antennas in receivers disposed at least in said predetermined territory and away from said plurality of emission antennas, transmitting the measured characteristics from said receivers to a central processing device, analyzing the measured characteristics in said central processing device as a function of prediction models for broadcasting waves in said predetermined territory in order to determine adjustment parameters for at least one part of said plurality of emission antennas to thereby minimize the impacpt of interference from external signals in said predetermined territory and to minimize interference by waves emitted by said plurality of emission antennas to area outside said predetermined territory, transmitting the determined adjustment parameters from said central processing device to control units associated with said one part of said plurality of emission antennas, and controlling said one part of said plurality of emission antennas as a function of said adjustment parameters by said control units.

2. A method as claimed in claim 1, wherein said adjustment parameters relates to the directivities and emitted powers of said one part of said plurality of emission antennas.

3. A method as claimed in claim 1, wherein said adjustment parameters relates to switching of the propagation mode of said emitted waves.

4. A method as claimed in claim 1, wherein one of the steps of measuring and analyzinging includes comparing received powers relating to waves emitted by said one part of said plurality of emission antennas to predetermine power thresholds in the coverage areas.

5. A method as claimed in claim 1 wherein one of the steps of measuring and analyzing includes comparing received powers relating to waves emitted by said plurality of emission antennas to receive powers relating to other waves emitted from different territories adjoining said coverage areas.

6. A method as claimed in claim 1, wherein said characteristics include received powers, impulse responses and signal-to-noise ratios.

7. A method as claimed in claim 1, including emitting radio waves by ground antennas of said plurality of emission antennas during the day and by ionospheric antennas of said plurality of emission antennas during the night.

8. A system of plurality of emission antennas for emitting synchronized radio waves in at least one frequency band respectively to coverage areas combined into a predetermined territory, said system including:

receivers disposed at least in said predetermined territory and away from said plurality of emission antennas for measuring characteristics of the waves emitted from said plurality of emission antennas to thereby transmit the measured characteristics to a central processing device, means included in said central processing device for analyzing the measured characteristics as a function of prediction models for broadcasting waves in said predetermined territory in order to determine adjustment parameters for at least one part of said plurality of emission antennas to thereby minimize the impact of interference from external signals in said predetermined territory and to minimize interference by waves emitted by said predetermined territory and to minimize interference by waves emitted by said plurality of emission antennas to areas outside said predetermined territory, and control units associated with said one part of said plurality of emission antennas and receiving the determined adjustment parameters from said central processing device for controlling said one part of said plurality of emission antennas as a function of the received adjustment parameters.

9. A system as claimed in claim 8, wherein at least one of said plurality of emission antennas is a ground wave antenna.

10. A system as claimed in claim 8, wherein at least one of said plurality of emission antennas is an ionospheric antenna.

11. A system as claimed in claim 8, wherein at least one of said plurality of emission antennas is a space wave antenna.

12. A central processing device in a system of a plurality of emission antennas for emitting synchronized radio waves in at least one frequency band respectively to coverage areas combined into a predetermine territory at least in which receivers away from said plurality of emission antennas are disposed and adapted to measure characteristics of the waves emitted from said plurality of emission antennas, said central processing device including:

means for analyzing the measured characteristics transmitted from receivers as a function of prediction models for broadcasting waves in said predetermined territory in order to determine adjustment parameters for at least one part of said plurality of emission antennas to thereby minimize the impact of interference from external signals in said predetermine territory and to minimize interference waves emitted by said plurality of emission antennas to areas outside said predetermined territory, and means for transmitting the determined adjustment parameters to control units associated with said one part of said plurality of emission antennas in order to control said on part of plurality of emission antennas as a function of the determined adjustment parameters by said control units.

* * * * *